(12) United States Patent
Yanakawa et al.

(10) Patent No.: US 6,947,093 B2
(45) Date of Patent: Sep. 20, 2005

(54) ORIENTATION ADJUSTABLE NETWORK CAMERA

(76) Inventors: Kooigi Yanakawa, 235 Chung-Ho Box 8-24, Taipei (TW); Igidan Kuloda, 235 Chung-Ho Box 8-24, Taipei (TW); Tochitochi Yamahala, 235 Chung-Ho Box 8-24, Taipei (TW)

( * ) Notice: Subject to any disclaimer, the term of this patent is extended or adjusted under 35 U.S.C. 154(b) by 4 days.

(21) Appl. No.: 10/338,909

(22) Filed: Jan. 6, 2003

(65) Prior Publication Data

US 2004/0130655 A1 Jul. 8, 2004

(51) Int. Cl.[7] .............................................. H04N 5/225
(52) U.S. Cl. .................................................... 348/373
(58) Field of Search .............................. 348/373–376, 348/335, 340, 552

(56) References Cited

U.S. PATENT DOCUMENTS 5,880,783 A * 3/1999 Ma ............................ 348/373
6,141,052 A * 10/2000 Fukumitsu et al. ......... 348/373
6,239,841 B1 * 5/2001 Verstockt et al. ........... 348/373
6,587,151 B1 * 7/2003 Cipolla et al. .............. 348/373
6,686,956 B1 * 2/2004 Prakash et al. ........... 348/218.1

* cited by examiner

Primary Examiner—Wendy R. Garber
Assistant Examiner—Gary C. Vieaux

(57) ABSTRACT

A network camera comprises a base clamped to a computer screen, and a camera body extended from a top of the base. The base is formed by connecting a front casing and a rear casing. Each of the coupling portions at tops of the front casing and rear casing has a semi-spherical groove. After the front casing and rear casing are engaged, the two semi-spherical grooves are formed as a round groove. The camera body is installed with a lens. An orientation of lens is adjustable. A bottom of the camera body is connected to a supporting arm of a signal transmission joint. Moreover, the camera body is formed as a universal joint in the round groove so that the orientation of the supporting arm is rotatable and the display frame shows a front view to present a wide eyesight.

3 Claims, 4 Drawing Sheets

ORIENTATION ADJUSTABLE NETWORK CAMERA

FIELD OF THE INVENTION

The present invention relates to network cameras, and particularly to a network camera; where the camera body is formed as a universal joint in the round groove so that as the orientation of a supporting arm is adjusted, the display frame shows a front view to present a wide eyesight.

BACKGROUND OF THE INVENTION

In the prior art, a network camera has extended from a seat. The seat is screwed to a periphery of a computer for communication. However, the lens of the camera body is fixed and motionless. Thereby, the view is only fixed at a narrow scope. Moreover, since the screw is directly screwed to the periphery of a computer, to change the position of the camera is difficult. Moreover, the sticking portion of the seat is possible to be destroyed.

SUMMARY OF THE INVENTION

Accordingly, the primary object of the present invention is to provide a network camera comprises a base clamped to a computer screen, and a camera body extended from a top of the base. The base is formed by connecting a front casing and a rear casing. Each of the coupling portions at tops of the front casing and rear casing has a semi-spherical grooves. After the front casing and rear casing are engaged, two semi-spherical grooves are formed as a round groove. The camera body is installed with a lens. An orientation of lens is adjustable. A bottom of the camera body is connected to a supporting arm of a signal transmission joint. Moreover, the camera body is formed as a universal joint in the round groove so as to rotate an orientation of the supporting arm.

Another object of the present invention is to provide a network camera, wherein the supporting arm of the camera body is arranged according to the height of the user; and the supporting arm is capable of rotating to any orientation. Then the lens of the camera is adjusted so that the display frame shows a front view to present a wide eyesight.

The various objects and advantages of the present invention will be more readily understood from the following detailed description when read in conjunction with the appended drawing.

BRIEF DESCRIPTION OF THE PREFERRED EMBODIMENTS

Figure 1:
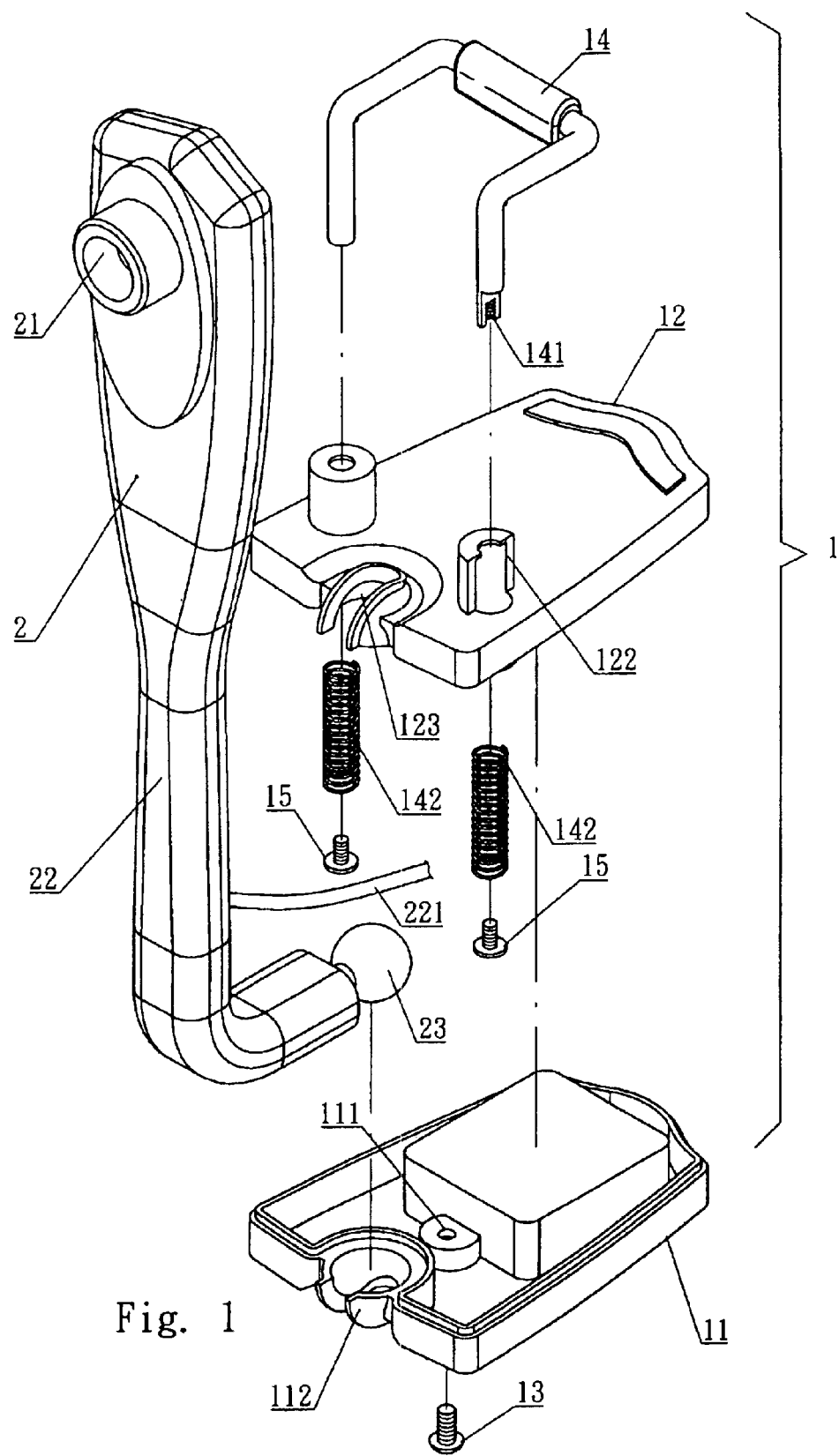
FIG. 1 is an exploded perspective view of the present invention.
Figure 2:
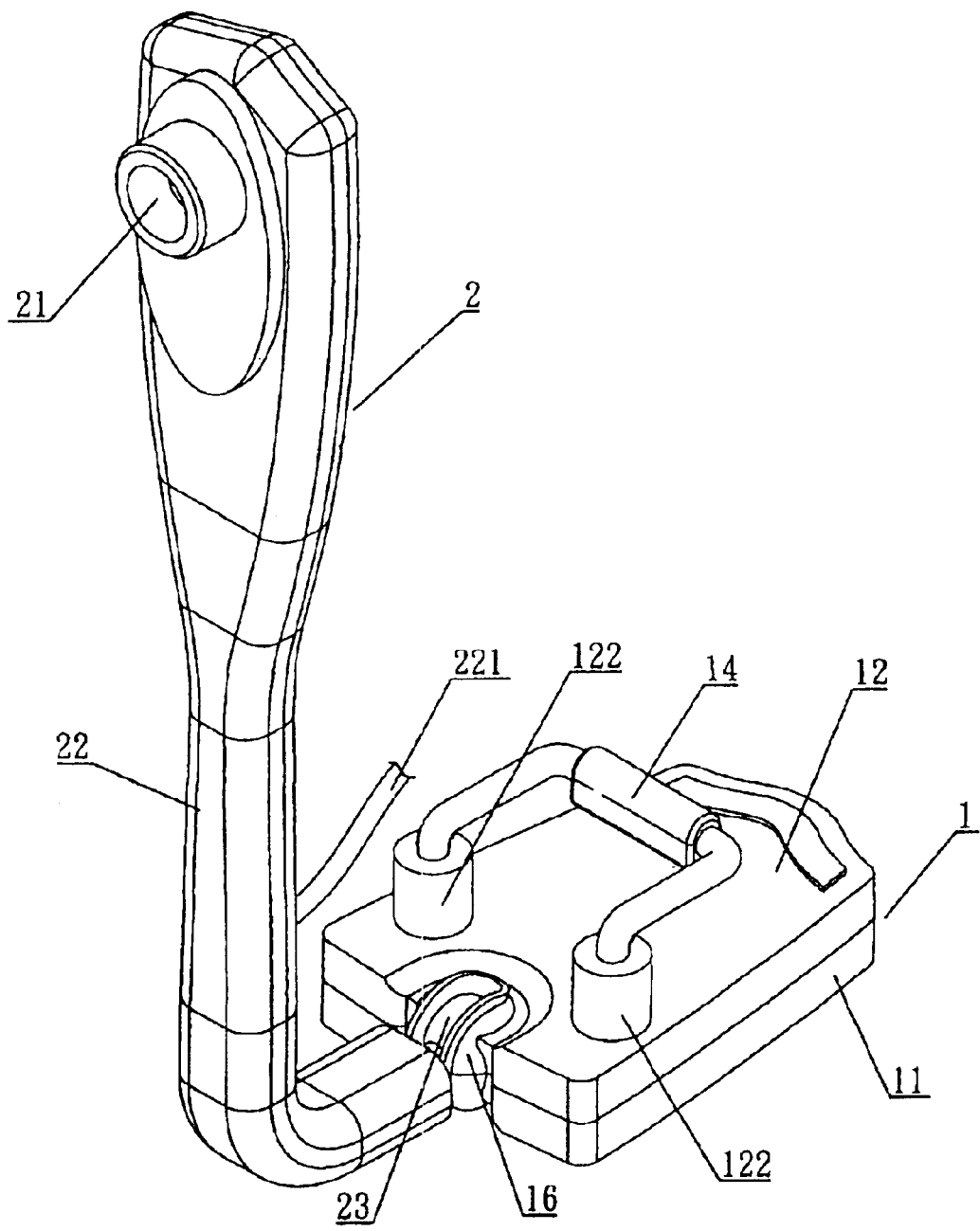
FIG. 2 is an assembled perspective view of the present invention.

Referring to FIGS. 1 and 3, the embodiment of the present invention is clearly shown. The network camera of the present invention includes a base 1 clamped to a computer screen, and a camera body 2 extended from a top of the base 1.

The base 1 is formed by connecting a front casing 11 and a rear casing 12. A surface of the front casing 11 is formed with a through hole 111. Thereby, a screw 13 can be inserted into the through hole 111 to lock the front casing 11 to the rear casing 12. Thereby, the front casing 11 and the rear casing 12 are assembled as an integral body.

Moreover, a rear end of the rear casing 12 is protruded with a guide ring 122. A clamping rod 14 exactly inserts into the guide ring 122 and then is positioned by a screw 15. An end portion of the clamping rod 14 has a thread hole 141, and an inserting end of the clamping rod 14 is engaged with a spring 142. The screw 15 slightly compresses the spring 142 to lock into the thread hole 141 of the clamping rod 14. Thereby, the clamping rod 14 is positioned at a rear end of the base 1. Generally, the spring 142 is in a release state so that the clamping rod 14 can be pulled backwards.

The coupling portions at the tops of the front casing 11 and rear casing 12 have respective semi-spherical groove 112 and semi-spherical groove 123. After the front casing 11 and rear casing 12 are engaged, the semi-spherical groove 112 and semi-spherical groove 123 are formed as a round groove 16.

The camera body 2 is installed with a lens 21 the orientation of which is adjustable. A bottom thereof is connected to a supporting arm 22 of a signal transmission joint 221. A lower end of the supporting arm 22 has a bending portion which is installed with a spherical embedding portion 23. The embedding portion 23 is exactly buckled to the round groove 16 formed by the front casing 11 and the rear casing 12 so that the spherical embedding portion 23 of the camera body 2 is formed as a universal joint in the round groove 16 so as to rotate an orientation of the supporting arm 22 (within a range of 360 degrees).

Figure 3C:
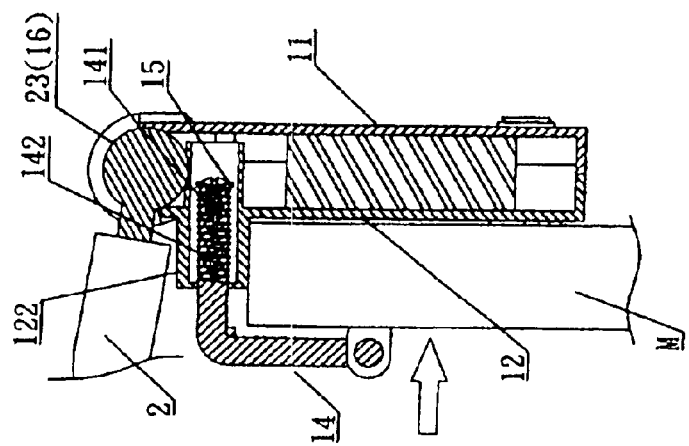
FIG. 3C is a plane cross sectional view showing the clamping rod is in a clamping state.
Figure 3B:
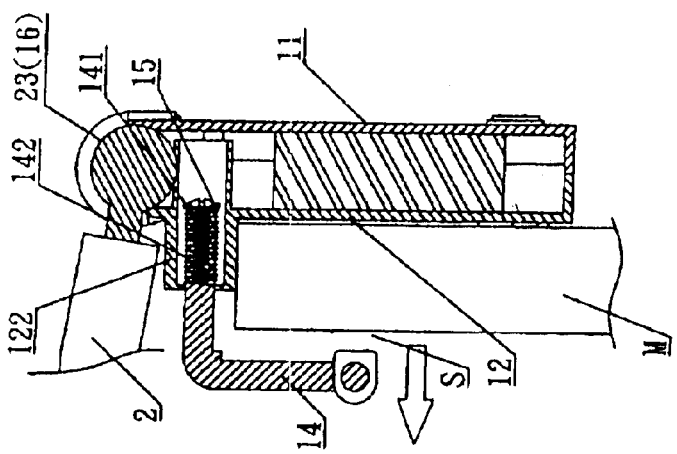
FIG. 3B is a plane cross sectional view showing the clamping rod of the present invention, which is in an extending state.
Figure 3A:
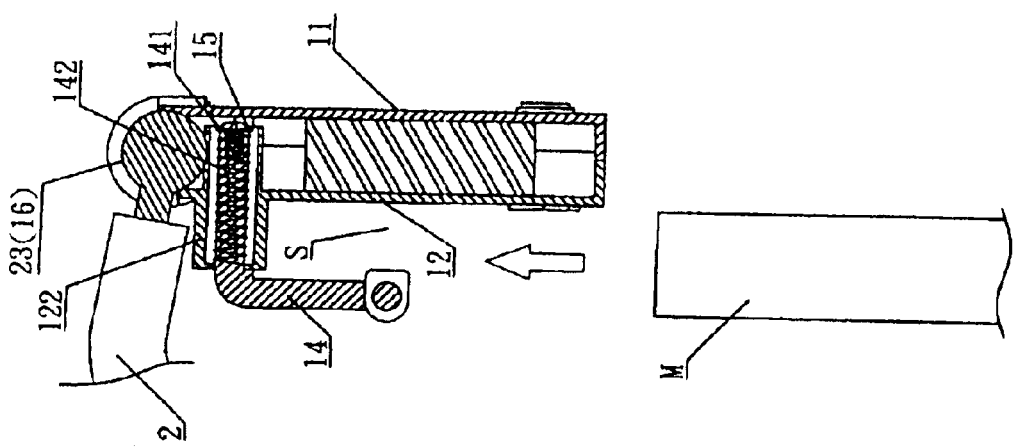
FIG. 3A is a plane cross sectional view showing the clamping rod of the present invention, which is in a normal state.

The operation of the present invention will be described in FIGS. 3A to 3C. In assembly, the clamping rod 14 is positioned by the spring 142 and the screw 15. Generally, the spring 142 is uncompressed (referring to FIG. 3A). When the base 1 is to be clamped in a specific position, the clamping rod 14 can be pulled backwards so that the screw 15 compress the spring 142 for expanding the clamping portion S (referring to FIG. 3B). When the clamping portion S are coupled to an object to be clamped, the spring 142 will restore (expand) according to the width of the clamping object. Thereby, it is clamped to a computer screen (referring to FIG. 3C).

By the clamping rod 14 of the base 1 to be pulled and capable of restoring to the original state, the present invention can be clamped in a computer screen. Therefore, the user has many ways for fix the present invention. Moreover, by the camera body 2 installed on the computer screen M, the spherical embedding portion 23 may rotate in the round groove 16 to any desired orientation so as to be formed as a universal joint. The supporting arm 22 of the camera body 2 can be arranged according to the height of the user. Moreover, the supporting arm 22 can be rotated to any orientation and then the lens 21 of the camera is adjusted so that the display frame shows a front view to present a wide eyesight.

Figure 4:
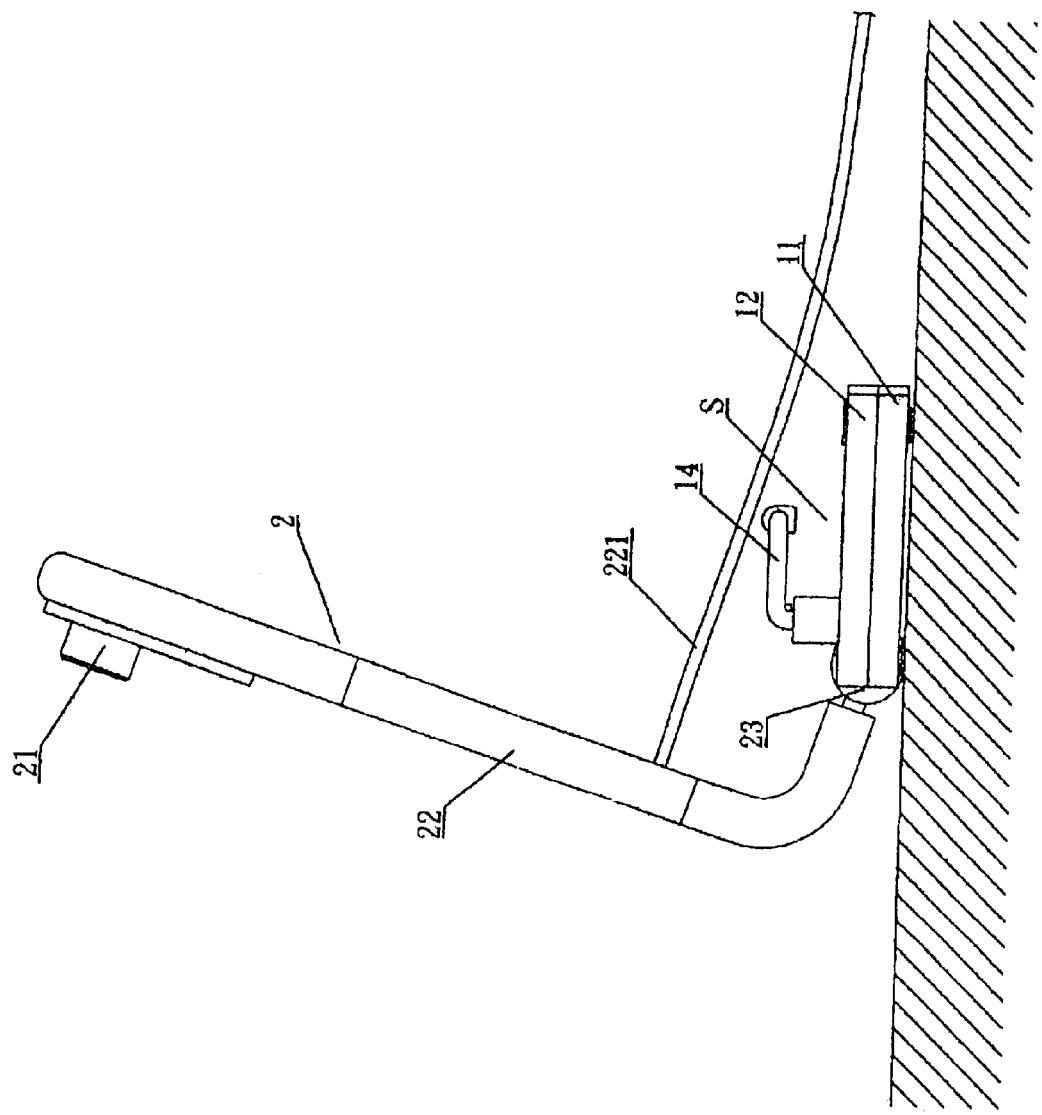
FIG. 4 shows an embodiment of the present invention, where the present invention is placed on a table.

Further referring to FIG. 4, in the network camera of the present invention, the base 1 can be horizontally placed on a table, the supporting arm 22 can be rotated through 180 degrees.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A network camera comprising a base clamped to a computer screen, and a camera body extended from a top of the base; wherein the base is formed by connecting a front casing and a rear casing; a rear end of the rear casing is protruded with a guide ring; a clamping rod exactly inserts into the guide ring and then is positioned by a screw; an end portion of the clamping rod has a thread hole, and an inserting end of the clamping rod is engaged with a spring; the screw slightly compresses the spring to lock into the thread hole of the clamping rod; the spring is in a release state so that the clamping rod can be pulled backwards;

each of the coupling portions at tops of the front casing and rear casing has a semi-spherical groove; after the front casing and rear casing are engaged, the two semi-spherical groove are engaged as a round groove; the camera body is installed with a lens; an orientation of lens is adjustable; a bottom of the camera body is connected to a supporting arm of a signal transmission joint; a lower end of the supporting arm has a bending portion which is installed with a spherical embedding portion; an embedding portion is exactly buckled to the round groove formed by the front casing and the rear casing so that the spherical embedding portion of the camera body is formed as a universal joint in the round groove so that an orientation of the supporting arm is adjustable.

2. The network camera as claimed in claim 1, wherein the supporting arm of the camera body is arranged according to the height of the user; and the supporting arm is capable of rotating to any orientation and then the lens of the camera is adjusted so that the display frame shows a front view to present a wide eyesight.

3. The network camera as claimed in claim 1, wherein the base is horizontally placed on a table, and the supporting arm is capable of rotating through 180 degrees.

* * * * *